(12) United States Patent
Lubin et al.

(10) Patent No.: US 11,977,831 B1
(45) Date of Patent: May 7, 2024

(54) ADDING MUSICAL WORKS LINKS TO TEXTUAL ITEMS

(71) Applicant: Xerox Corporation, Norwalk, CT (US)

(72) Inventors: Dara N. Lubin, Pittsford, NY (US); Elizabeth L. Barrese, Penfield, NY (US); Elizabeth M. Crossen, Churchville, NY (US); Ron E. Dufort, Rochester, NY (US); Matthew J. Ochs, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/052,531

(22) Filed: Nov. 3, 2022

(51) Int. Cl.
*G06F 40/134* (2020.01)
*G06F 16/683* (2019.01)
*G06F 40/279* (2020.01)

(52) U.S. Cl.
CPC .......... *G06F 40/134* (2020.01); *G06F 16/683* (2019.01); *G06F 40/279* (2020.01)

(58) Field of Classification Search
None
See application file for complete search history.

(56) References Cited

U.S. PATENT DOCUMENTS

| | | | |
|---|---|---|---|
| 7,003,515 B1 | 2/2006 | Glaser et al. | |
| 7,742,953 B2 | 6/2010 | King et al. | |
| 7,831,912 B2 | 11/2010 | King et al. | |
| 9,800,941 B2 | 10/2017 | Evans | |
| 10,496,683 B2 | 12/2019 | Franceschini et al. | |
| 10,529,310 B2 | 1/2020 | Serletic et al. | |
| 2008/0243788 A1 | 10/2008 | Reztlaff et al. | |
| 2012/0221936 A1 | 8/2012 | Patterson et al. | |
| 2013/0334300 A1 | 12/2013 | Evans | |
| 2017/0041494 A1* | 2/2017 | Fernandes | G06F 3/1285 |
| 2018/0032305 A1* | 2/2018 | Cameron | G06F 40/30 |
| 2021/0357447 A1* | 11/2021 | McKenzie | G11B 27/34 |
| 2023/0141104 A1* | 5/2023 | Alluri | G06N 7/01 |
| | | | 707/769 |

OTHER PUBLICATIONS

Back, Maribeth, Jonathan Cohen, Rich Gold, Steve Harrison, and Scott Minneman. "Listen reader: an electronically augmented paper-based book." In Proceedings of the SIGCHI conference on Human factors in computing systems, pp. 23-29. 2001. (Year: 2001).*

* cited by examiner

*Primary Examiner* — Frank D Mills
(74) *Attorney, Agent, or Firm* — Gibb IP Law Firm, LLC

(57) ABSTRACT

An input/output of a system receives an electronic file comprising text. A processor of the system identifies keywords in the text. The processor correlates the keywords to music attributes and matches the music attributes to musical works. The processor determines computer network locations of the musical works. The processor also adds links to the network locations of the musical works to the electronic file to create a music-enhanced electronic file. The input/output outputs the music-enhanced electronic file that now contains the links to the musical works.

17 Claims, 6 Drawing Sheets

| Keyword | Number of Occurrences | Attribute 1 - Celtic Influences | Attribute 2 - Bass Drums | Attribute 3 - Folk Music | Attribute 4 - Harp | Attribute 5 - Bagpipes | Attribute 6 - Subtle Use of Strings | Attribute 7 - Acoustic Guitar Layering | Attribute 8 - Vocal Harmonies |
|---|---|---|---|---|---|---|---|---|---|
| Castle | 8 | 1 | 1 | 0 | 1 | 1 | 0 | 0 | 0 |
| Ireland | 25 | 1 | 0 | 1 | 1 | 0 | 0 | 0 | 1 |
| Highlands | 15 | 1 | 1 | 1 | 0 | 1 | 1 | 1 | 1 |
| Scotland | 22 | 1 | 0 | 0 | 0 | 1 | 1 | 1 | 1 |
| mist | 8 | 1 | 0 | 0 | 0 | 0 | 1 | 0 | 1 |
| loch | 20 | 1 | 0 | 0 | 0 | 1 | 1 | 0 | 1 |
| COUNT => | | 6 | 2 | 2 | 2 | 4 | 4 | 2 | 5 |

FIG. 3

ADDING MUSICAL WORKS LINKS TO TEXTUAL ITEMS

BACKGROUND

Systems and methods herein generally relate to systems and methods that match text to musical works and add links to the musical works to the text.

Stories, history, artwork, and information have been recorded and disseminated throughout time using hardcopy products including cave walls, stone tablets, animal skins, various forms of paper, etc. With the Gutenberg printing press, mass publication of printed items became possible. For hundreds of years, press-printed newspapers, pamphlets, and bound books were the predominate consumption of the literate population.

In the last 75 years, hardcopy communications have been supplemented with an extensive array of electronic communication formats. However, the market for printed text products remains strong because many end users prefer the experience of reading a physical book. Therefore, despite the recent onslaught of electronic text formats, improving the traditional printed book, newspaper, pamphlet, etc., remains a useful art.

SUMMARY

Various methods herein receive, into an input/output of a system, an electronic file having text. These methods identify, using a processor of the system, keywords in the text and correlate the keywords to music attributes (potentially using a correlation table). In such processing, the processor matches the music attributes to musical works and determines computer network locations of the musical works. Then, using the processor, these methods add links to the network locations of the musical works to the electronic file in order to create a music-enhanced electronic file. Such methods output, from the input/output, the music-enhanced electronic file.

In some embodiments, these methods receive, into the input/output, user feedback on the musical works. This allows the processor to alter the links based on the user feedback, alter the musical works based on the user feedback, alter the music attributes based on the user feedback; etc.

The process of matching the music attributes to musical works can include, for example, matching the music attributes for the text to musical categories in which the musical works are classified. Also, the process of identifying the keywords can, for example, evaluate word usage rate and word location within the text. Further, the links can be, for example, computer-readable codes such as glyphs, barcodes, QR (quick-reference) codes, etc.

Additional methods herein receive, into the input/output of the system, an electronic book to be printed in hardcopy. The electronic book has text, and such methods again use the processor of the system to identify keywords in the text, and the processor is used to correlate the keywords to music attributes (potentially using a correlation table). Here, with such methods, the processor is used to match the music attributes to musical playlists and to determine computer network locations of the musical playlists. With these methods, the processor is used to add links to the network locations of the musical playlists to the electronic book to create a music-enhanced electronic book. These methods then use a printer of the system to print a hardcopy of the music-enhanced electronic book.

In some embodiments, these methods receive, into the input/output, user feedback on the musical works. This allows the processor to alter the links based on the user feedback, alter the musical works based on the user feedback, alter the music attributes based on the user feedback; etc.

The process of matching the music attributes to musical works can include, for example, matching the music attributes for the text to musical categories in which the musical works are classified. Also, the process of identifying the keywords can, for example, evaluate word usage rate and word location within the text. Further, the links can be, for example, computer-readable codes such as glyphs, barcodes, QR (quick-reference) codes, etc.

Systems herein include (among other components) an input/output adapted to receive an electronic file comprising text and a processor adapted to identify keywords in the text. The processor is also adapted to correlate the keywords to music attributes, to match the music attributes to musical works, to determine computer network locations of the musical works, and to add links to the network locations of the musical works to the electronic file to create a music-enhanced electronic file. The input/output is further adapted to output the music-enhanced electronic file.

The input/output is adapted to receive user feedback on the musical works. The processor is adapted to alter the links based on the user feedback, to alter the musical works based on the user feedback, to receive user feedback on the musical works, to alter the music attributes based on the user feedback, etc. The matching process matches the music attributes for the text to musical categories in which the musical works are classified. The process of identifying keywords can, for example, evaluate word usage rate and word location within the text.

These and other features are described in, or are apparent from, the following detailed description.

BRIEF DESCRIPTION OF THE DRAWINGS

Various exemplary systems and methods are described in detail below, with reference to the attached drawings, in which:

FIG. 3 is a schematic diagram of a correlation table created and used by systems and methods herein;

DETAILED DESCRIPTION

Figure 1:
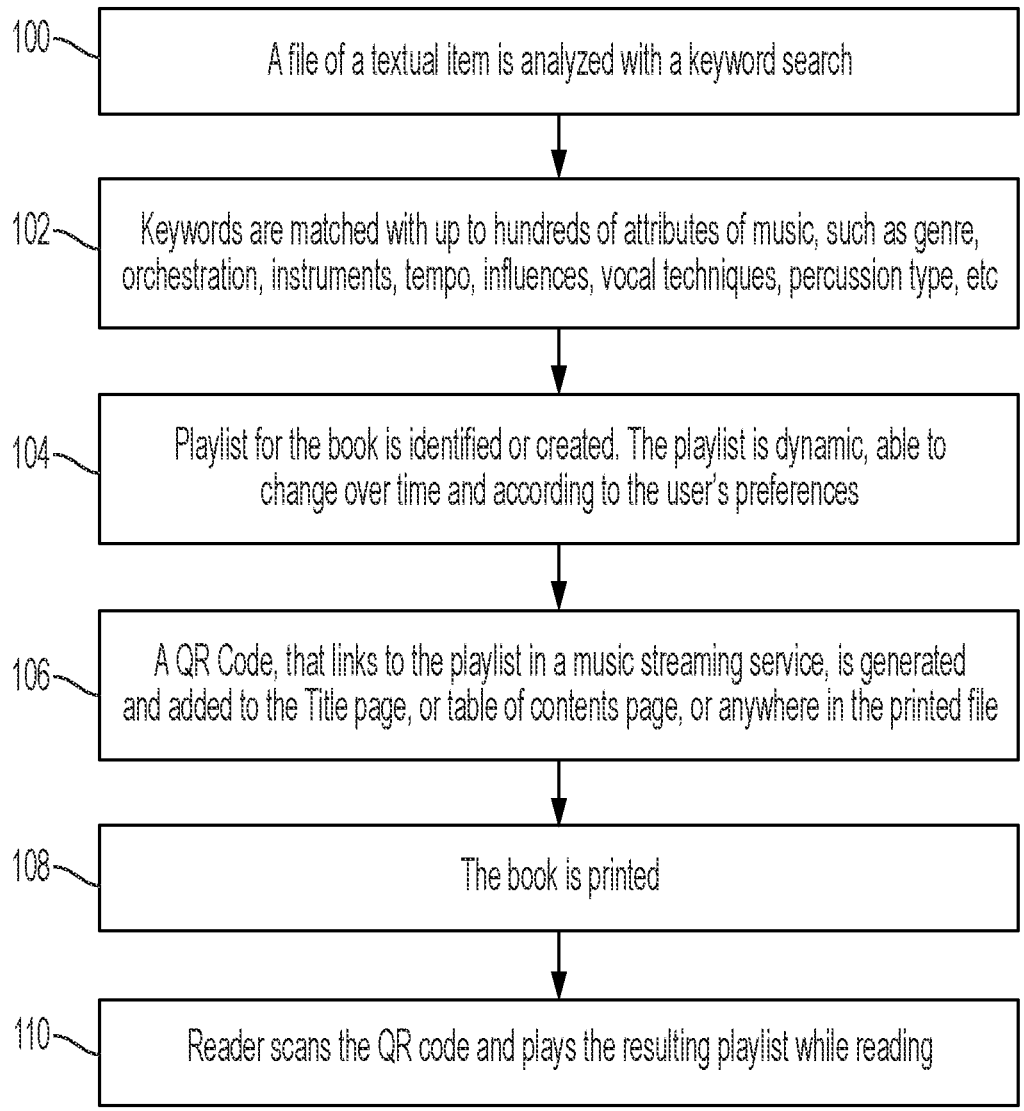
FIG. 1 is a flow diagram of various methods herein.

As noted above, many users prefer the experience of reading a physical book. Typically, features that make a book interactive, such as augmented reality, or buttons with printed circuits in the page, interrupt the immersive experience of reading. In view of such issues, the systems and methods herein add a new experience to reading a printed book that enhances the reading experience, while still allowing the reader to read uninterrupted. This is achieved by adding links to music that relates to the theme of the text and this provides background ambient enrichment.

More specifically, the processing herein performs a keyword search of the text in the book and matches such keywords with attributes of music. The systems and methods herein add computer-readable codes (e.g., barcodes, QR codes, etc.) to the electronic file that is to be printed. Such codes link to the matched music (e.g., to a playlist accessible on a computer network, such as the Internet). In some examples, the computer-readable codes can be printed in the preface of the book, or a different code could be included at the beginning of each chapter or section of the book.

From the electronic (e.g., pdf) file for the book, this processing identifies keywords in the text that indicate the context or theme of the book. For example, the systems and methods herein search the text for keywords that indicate geography, dates, scenery settings, etc. Next, these keywords are matched with music that can evoke these themes or emotions. This processing matches specific keywords to specific attributes of the music. In some embodiments, a table of associations or correlation table can be used to help match the text keywords to the music.

As a supplement to keywords in the text, the systems and methods herein can use any book metadata that is in the electronic file to help determine the context/theme of the book. For example, book metadata can include promotional paragraphs that appear in online marketing material or on the back panel of the hardcopy of the book. This metadata can provide a more concentrated keyword analysis, and the processing herein can look for keywords such as thriller, suspense, terror, drama, etc., and use these words as well as keywords found in the text of the book when matching music.

As far as the attributes of music or playlists, it is common for electronic music filed to be tagged with several hundreds of attributes such as genre, rhythm, instrumentation, etc. For example, keywords associated with planets, future years, and space travel are matched with specific science fiction themed musical playlists. Keywords that relate to historical settings and royal titles are matched with playlists that concentrate on music with harps, drums, or violas.

In the relatively low-occurrence situation where a book is made into a movie (or vice versa), the book can include a link to the movie soundtrack. However, unlike a traditional movie tie-in soundtrack which has a finite number of songs and is associated with a single book, the systems and methods herein provide links to generic streaming playlists applicable to an unlimited number of different books. Thus, such playlists are not limited to a single book (as a soundtrack may be) and these playlists can change over time and according to user preferences.

Therefore, these systems and methods provide enhanced features for printed textual items such as books, newspapers, magazines, pamphlets, etc., that can boost interest in printed pages. Unlike sheet music that contains links to the song that is printed on the sheet music, the links provided by systems and methods provide background music that creates a mood and atmosphere for readers to enhance their deep reading experience without interrupt their reading experience.

FIG. 1 is flowchart illustrating exemplary methods herein. In item 100, the electronic file of a textual items (e.g., book, magazine, pamphlet) is analyzed with a keyword search. The keywords indicate the mood, emotional environment, scene setting, etc., of the text. In item 102, the keywords that are found in item 100 are matched with up to hundreds of attributes of music, such as genre, orchestration, instruments, tempo, influences, vocal techniques, percussion type, etc., using a correlation table, for example.

In item 104, the processing herein identifies or creates a playlist that matches the musical attributes indicated by the keywords found in the text. This playlist can be dynamic and is able to change over time and according to user's preferences (user likes, dislikes, additions, subtractions, etc.). In item 106, a code (such a QR code, barcode, glyph, etc.) that links to the playlist in a music streaming service, is generated and added to the title page, or table of contents page, or anywhere in the printed file. The book is printed in item 108 and, in item 110, a reader scans the QR code and plays the resulting playlist while reading.

Figure 2:
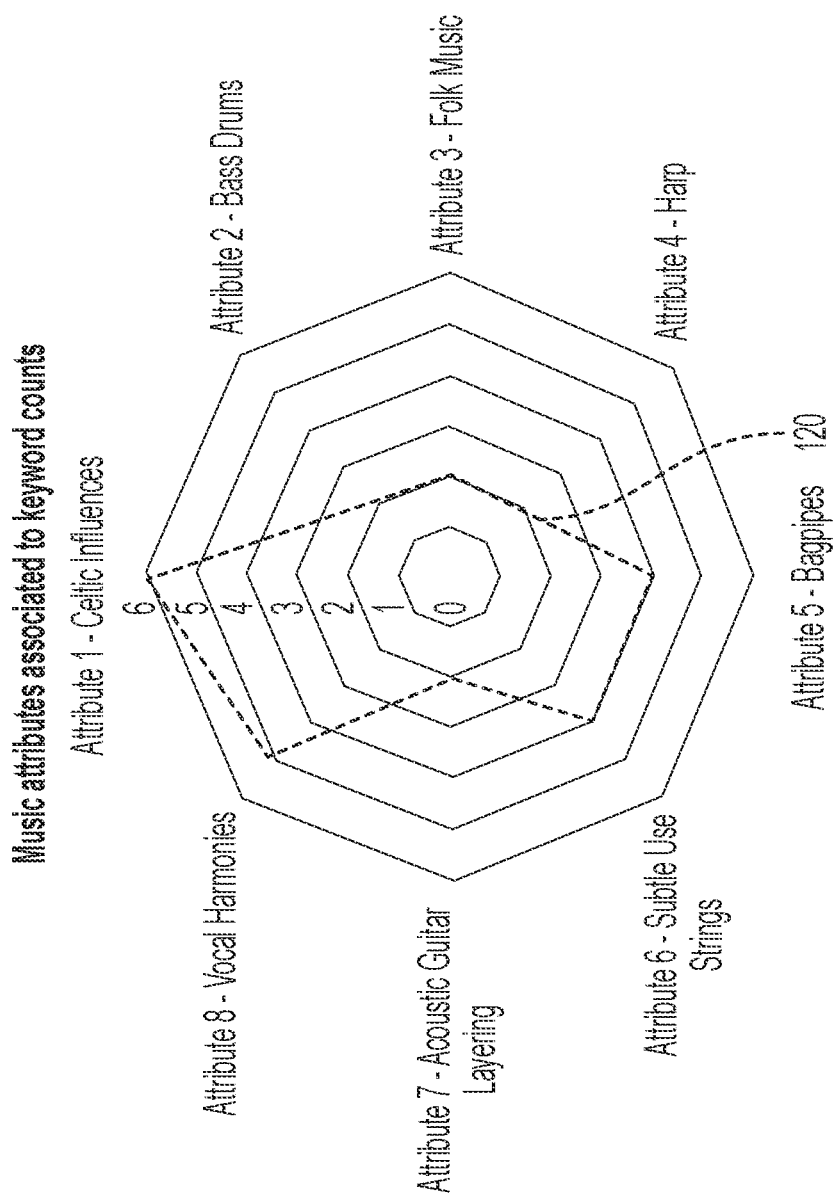
FIG. 2 is a schematic diagram illustrating operations of systems and methods herein.

With regard to the process of matching the mood, emotional environment, scene setting, etc., indicated by some of the keywords found in the text in item 104, FIG. 2 shows one possible association of music attributes to keyword counts and FIG. 3 is an association table or correlation table of textual instances of some exemplary keywords in the text. While FIG. 3 is a very limited example, the keywords included in the correlation table may be filtered to limit the processed keywords to only those that exceeded a minimum occurrence number/rate (e.g., only keywords that occur at least 8 times or 8 times per 10 pages, per chapter, etc.) for example. Any similar filtering criteria can be used to determine which keywords are included/excluded in/from the correlation table.

More specifically, as can be seen in FIG. 3 in one example the keyword "Ireland" occurred 25 times in the text. Further, the correlation table in FIG. 3 shows that the keyword "Ireland" has a positive association (indicated by value 1, while lack of association is a value 0) with various musical attributes including Celtic influences, folk music, harp, and vocal harmonies.

Additionally, the number of keywords that have a positive association with each musical attribute can also be tabulated. Here, for example, the musical attribute Celtic influences is associated with (matches) six of the keywords in the correlation table, while the music attribute bass drums only matches two of the keywords. The tabulation of matches per music attribute in FIG. 3 can also be weighted by the occurrence rate of the keywords (e.g., more weighting for keywords Ireland, Highlands, Scotland, and loch; and less weighting for castle and mist because of their relatively lower occurrence).

Referring back to FIG. 2, the outline 120 in the center graphically shows the high occurrence rate of keywords within selected music attributes. Musical playlists that match the same concentration of music attributes (those within the outline 120) are considered matching playlists with the most closely matched playlist being automatically selected to be linked to by the computer-readable code that is to be printed in the book.

Figure 4:
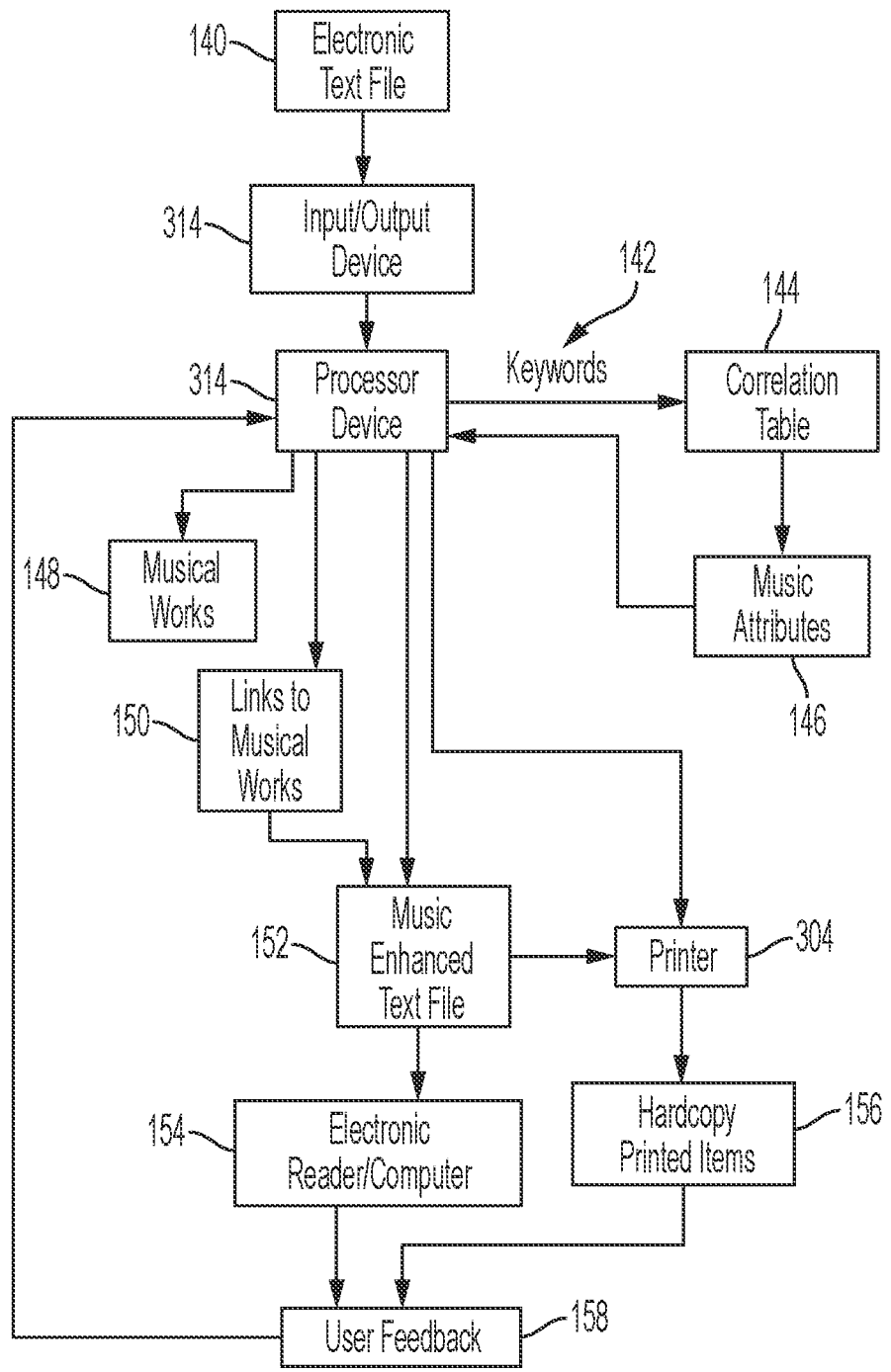
FIG. 4 is a system diagram of various methods herein.

FIG. 4 is a conceptual illustration that shows that an input/output 314 of a system receives an electronic file 140 having text. These methods identify, using a processor 316 of the system, keywords 142 in the text. Also, the process of identifying the keywords 142 can, for example, evaluate word usage rate and word location within the text. Therefore, words that occur frequently, words in chapter titles, words in book metadata, etc., can receive higher weighting or inclusion in the correlation table 144.

Then, the processor correlates the keywords 142 to music attributes 146 using the correlation table 144. The processor matches the music attributes 146 to musical works 148, such a music playlists that are available on a user-accessible network. The process of matching the music attributes to musical works can include, for example, matching the music attributes for the text to musical categories in which the musical works are classified (e.g., by music attributes, etc.). The processor also identifies network locations of the musical works and creates links 150 to such musical works.

Further, the links 150 can be, for example, computer-readable codes such as glyphs, barcodes, QR (quick-reference) codes, etc.

Then, using the processor 316, these methods add the links 150 to the electronic file 140 in order to create a music-enhanced electronic text file 152. Such methods output, from the input/output 314 system, the music-enhanced electronic text file 152. As shown in FIG. 4, the music-enhanced electronic text file 152 can be output to an electronic reader or other computerized device 154 or the music-enhanced electronic text file 152 can be output to a printer 304 to produce hardcopy printed items 156, such as books, magazines, pamphlets, etc.

The user of the electronic reader/computer 154 can click on the links to play the musical works 148 while they read the text. Similarly, the user of the hardcopy printed items 156 can use a computerized device (e.g., smartphone, computer, electronic reader, etc.) to read the computer-readable links 150 to the musical works 148 that are printed on one or more of the pages of the hardcopy printed items 156 to cause the computerized device to play the musical works 148 while they read the printed text.

In some embodiments, these methods can receive, into the input/output 314 system, user feedback 158 on the musical works when users post comments on social media cites accessible to the processor 314 or on dedicated web sites related to the publisher or book. This allows the processor 316 to alter the links 150, alter the musical works 148, alter the music attributes of the correlation table 144, etc., based on the user feedback 158.

These systems and methods enhance user enjoyment by playing background music that complements the mood, emotional environment, scene setting, etc., of the text they are reading. The use of playlists helps provide music length appropriate for users who read at different speeds and helps reduce repeating musical pieces. Different playlists can be accessed for different chapters of a book where, for example, the mood, emotional environment, scene setting, etc., may change dramatically between different chapters. With embodiments herein the musical works selected can be free of (or be selected to have limited) words to allow the user to focus on the words in the text begin read. In this way, the musical works complement the text by enhancing the mood, emotional environment, scene setting, etc. of the text.

Figure 5:
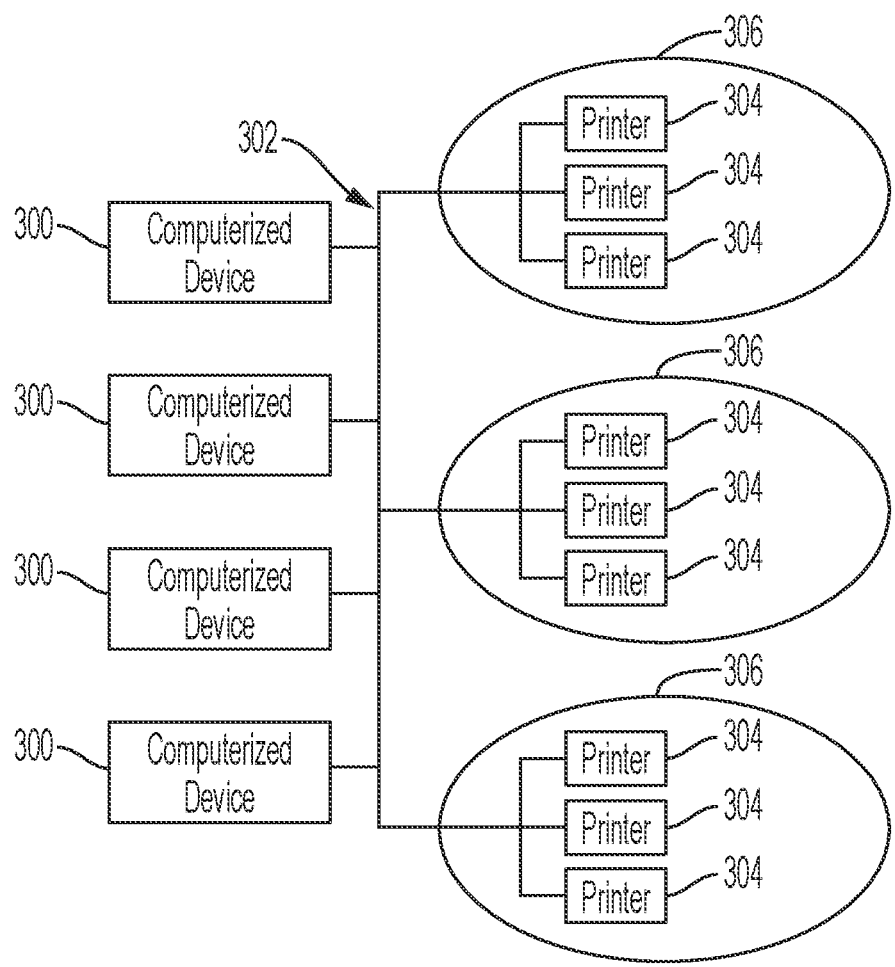
FIG. 5 is a schematic diagram illustrating systems herein.

As shown in FIG. 5, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 6:
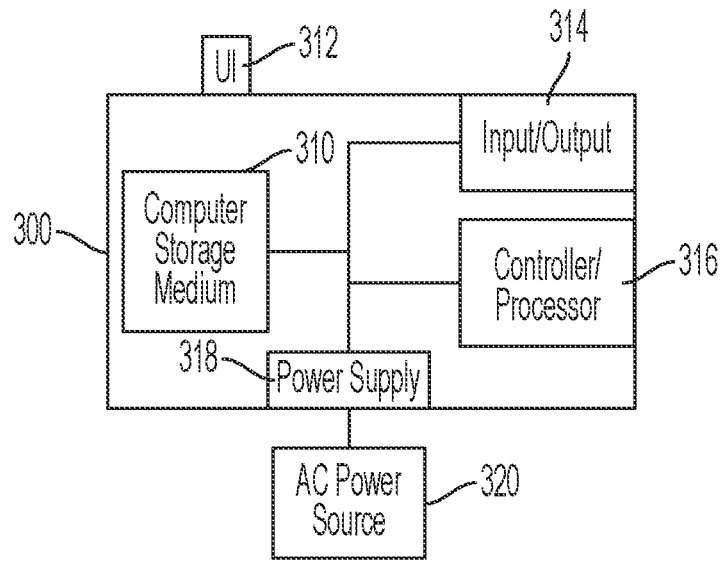
FIG. 6 is a schematic diagram illustrating devices herein.

FIG. 6 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 6, a body housing has one or more functional components that operate on power supplied from an alternating current (AC) source 320 by the power supply 318. The power supply 318 can comprise a common power conversion unit, power storage element (e.g., a battery, etc.), etc.

Figure 7:
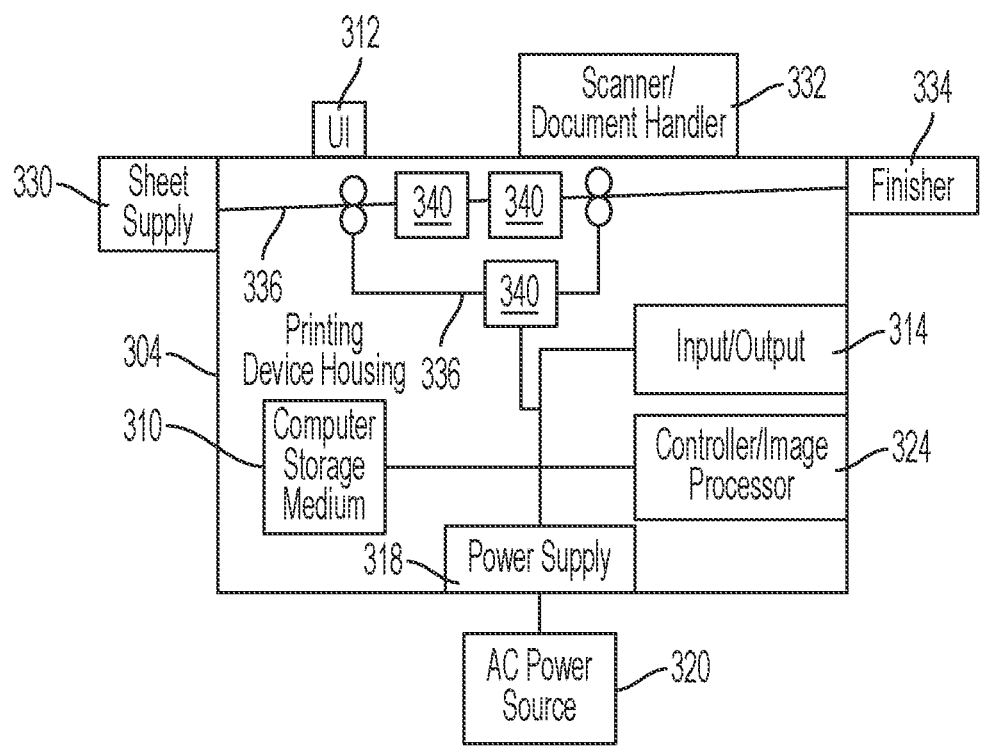
FIG. 7 is a schematic diagram illustrating devices herein.

FIG. 7 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 316 (that can be different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

The one or more printing engines 340 are intended to illustrate any marking device that applies a marking material (toner, inks, etc.) to continuous media or sheets of media, whether currently known or developed in the future and can include, for example, devices that use an ink jet imaging system or a high-speed aqueous imaging system.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving, into an input/output of a system, an electronic file comprising chapters of text;
   identifying, using a processor of the system, keywords in the text;
   correlating, using the processor, the keywords in each of the chapters of the electronic file to music attributes;
   matching, using the processor, the music attributes of each of the chapters to musical works;
   determining, using the processor, computer network locations of the musical works;
   adding, using the processor, a computer-readable code comprising links to the computer network locations of the musical works to the beginning of each of the chapters of the electronic file to create a music-enhanced electronic file;
   printing, using a printer of the system, a hardcopy of the music-enhanced electronic file;
   receiving, into the input/output, user feedback on the musical works from users posting comments on social media sites accessible to the system; and
   altering, using the processor, the musical works based on the user feedback.

2. The method according to claim 1, further comprising: altering,
   using the processor, the links based on the user feedback.

3. The method according to claim 1, further comprising: altering,
   using the processor, the music attributes based on the user feedback.

4. The method according to claim 1, wherein the matching comprises matching the music attributes for the text to the musical works.

5. The method according to claim 1, wherein the matching comprises using a correlation table.

6. The method according to claim 1, wherein the links comprise computer-readable codes.

7. A method comprising:
   receiving, into an input/output device of a system, an electronic book comprising chapters of text;
   identifying, using a processor of the system, keywords in the text;
   correlating, using the processor, the keywords in each of the chapters of the electronic book to music attributes;
   matching, using the processor, the music attributes of each of the chapters to musical playlists;
   determining, using the processor, computer network locations of the musical playlists;
   adding, using the processor, a QR code comprising links to the computer network locations of the musical playlists to the beginning of each of the chapters of the electronic book to create a music-enhanced electronic book;
   printing, using a printer of the system, a hardcopy of the music-enhanced electronic book;
   receiving, into the input/output device, user feedback on the musical playlists from users posting comments on social media sites accessible to the system; and
   altering, using the processor, the musical playlists based on the user feedback.

8. The method according to claim 7, further comprising: altering,
   using the processor, the links based on the user feedback.

9. The method according to claim 7, further comprising: altering,
   using the processor, the music attributes based on the user feedback.

10. The method according to claim 7, wherein the matching comprises matching the music attributes for the text to the musical playlists.

11. The method according to claim 7, wherein the matching comprises using a correlation table.

12. The method according to claim 7, wherein the links comprise computer-readable codes.

13. A system comprising:
   an input/output adapted to receive an electronic file comprising chapters of text; and
   a processor adapted to identify keywords in the text,
   wherein the processor is adapted to correlate the keywords in each of the chapters of the electronic file to music attributes,
   wherein the processor is adapted to match the music attributes of each of the chapters to musical works,
   wherein the processor is adapted to determine computer network locations of the musical works,
   wherein the processor is adapted to add a computer-readable code comprising links to the computer network locations of the musical works to the beginning of each of the chapters of the electronic file to create a music-enhanced electronic file, and
   wherein the input/output is adapted to output print a hardcopy of the music-enhanced electronic file, wherein the input/output is adapted to receive user feedback on the musical works from users posting comments on social media sites accessible to the system, and wherein the processor is adapted to alter the musical works based on the user feedback.

14. The system according to claim 13, wherein the processor is adapted to alter the links based on the user feedback.

15. The system according to claim 13, wherein the processor is adapted to alter the music attributes based on the user feedback.

16. The system according to claim 13, wherein the processor is adapted to match by matching the music attributes to the musical works.

17. The system according to claim 13, wherein the processor is adapted to match by using a correlation table.

* * * * *